(12) United States Patent
Wu

(10) Patent No.: US 11,377,154 B2
(45) Date of Patent: Jul. 5, 2022

(54) VEHICLE BODY STRUCTURE

(71) Applicant: Ningbo Geely Automobile Research & Development Co., Ltd., Ningbo (CN)

(72) Inventor: Biquan Wu, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 16/994,617

(22) Filed: Aug. 16, 2020

(65) Prior Publication Data

US 2020/0377155 A1 Dec. 3, 2020

Related U.S. Application Data

(63) Continuation of application No. PCT/CN2019/074979, filed on Feb. 13, 2019.

(30) Foreign Application Priority Data

Feb. 26, 2018 (EP) ..................................... 18158584

(51) Int. Cl.
*B62D 25/02* (2006.01)
*B62D 25/06* (2006.01)
(Continued)

(52) U.S. Cl.
CPC ............ *B62D 25/06* (2013.01); *B62D 25/02* (2013.01); *B62D 27/02* (2013.01); *B62D 27/023* (2013.01); *B62D 27/065* (2013.01)

(58) Field of Classification Search
CPC ........ B62D 25/02; B62D 25/06; B62D 27/02; B62D 27/023; B23K 1/005
(Continued)

(56) References Cited

U.S. PATENT DOCUMENTS 5,795,014 A * 8/1998 Balgaard ................ B62D 25/06
296/203.01
2010/0259073 A1* 10/2010 Gruneklee ............. B62D 25/06
296/225
2017/0233014 A1* 8/2017 Kuwahara ............ B62D 27/023
296/210

FOREIGN PATENT DOCUMENTS

CN 101808881 A 8/2010
CN 203047395 U 7/2013
(Continued)

OTHER PUBLICATIONS

International Search Report and Written Opinion from corresponding International Application No. PCT/CN2019/074979, dated Apr. 28, 2019, 9 pages.
(Continued)

*Primary Examiner* — Dennis H Pedder
(74) *Attorney, Agent, or Firm* — Tucker Ellis LLP

(57) ABSTRACT

A vehicle body structure includes a roof structure and a lateral side structure, wherein the roof structure includes a roof panel fastened to an underlying roof reinforcement frame, wherein the lateral side structure includes a side panel fastened to an underlying side support structure, wherein a lateral side of the roof panel is fastened to the roof reinforcement frame by means of a hemming joint that is formed by folding a lateral side of the roof panel around an edge of the roof reinforcement frame, and wherein a folded side edge of the roof panel is fastened to the side panel by means of an elongated laser brazing joint.

16 Claims, 2 Drawing Sheets

(51) Int. Cl.
  *B62D 27/02*      (2006.01)
  *B62D 27/06*      (2006.01)
(58) Field of Classification Search
  USPC .................. 296/210, 203.01, 203.03, 29
  See application file for complete search history.

(56) References Cited

FOREIGN PATENT DOCUMENTS

| | | | |
|---|---|---|---|
| CN | 103587586 A | | 2/2014 |
| CN | 203439147 U | | 2/2014 |
| CN | 206234211 U | | 6/2017 |
| DE | 10061309 A1 | | 6/2002 |
| DE | 102004016849 A1 | | 11/2005 |
| DE | 102004019818 A1 | | 12/2005 |
| DE | 112013000978 | * | 12/2013 |
| JP | 2002211442 A | | 7/2002 |
| JP | 2010111346 A | * | 5/2010 |
| WO | 2009030730 A1 | | 3/2009 |

OTHER PUBLICATIONS

European Search Report from corresponding European Application No. 18158584, dated Sep. 27, 2018, 2 pages.

* cited by examiner

VEHICLE BODY STRUCTURE

RELATED APPLICATION DATA

This application is a continuation of International Patent Application No. PCT/CN2019/074979, filed Feb. 13, 2019, which claims the benefit of European Patent Application No. 18158584.5, filed Feb. 26, 2018, the disclosures of which are incorporated herein by reference in their entireties.

TECHNICAL FIELD

The disclosure relates to a vehicle body structure comprising a roof structure and a lateral side structure. The disclosure also relates to a vehicle comprising such a vehicle body structure and a method for connecting a vehicle roof structure to a vehicle lateral side structure to form a vehicle body structure.

Although the disclosure will be primarily described in relation to a car, the disclosure is not restricted to this particular type of vehicle, but may as well be applied and used in other type of vehicles such as minivans, recreational vehicles, off-road vehicles, trucks, buses or the like.

BACKGROUND ART

A vehicle body structure typically comprises the inner vehicle body and outer panels attached thereto. The inner vehicle body may for example be made of steel or aluminium and having openings for windows, door, hood, etc., and the outer panels are typically made of sheet steel or sheet aluminium pressed into desired 3D-shapes.

In the field of vehicle body structure there is a continuous demand for improving the robustness, strength and torsional rigidity of the body structure while providing a vehicle body structure with low weight. High robustness, strength and torsional rigidity of the vehicle body structure means improved crash safety since the passenger compartment is less deformed, and improved vehicle drivability since the body structure is stiffer and provide better Despite the activities in the field, there is still a demand for an improved vehicle body structure which is capable of meeting higher requirements in terms of robustness, strength and torsional rigidity of the body structure while providing a vehicle body structure with low weight.

SUMMARY OF THE DISCLOSURE

A general object of the present disclosure is to provide an improved vehicle body structure which is capable of meeting higher requirements in terms of robustness, strength and torsional rigidity of the body structure while providing a vehicle body structure with low weight.

This and other objects, which will become apparent in the following, are at least partly accomplished by a vehicle body structure as defined in the accompanying independent claims. Details of some example embodiments and further optional features are recited in the associated dependent claims.

According to a first aspect of the present disclosure, there is provided a vehicle body structure comprising a roof structure and a lateral side structure, wherein the roof structure comprises a roof panel fastened to an underlying roof reinforcement frame, wherein the lateral side structure comprises a side panel fastened to an underlying side support structure, wherein a lateral side of the roof panel is fastened to the roof reinforcement frame by means of a hemming joint that is formed by folding a lateral side of the roof panel around an edge of the roof reinforcement frame, and wherein the folded edge of the roof panel is fastened to the side panel by means of an elongated laser brazing joint.

According to a second aspect of the present disclosure, there is provided a method for connecting a vehicle roof structure to a vehicle lateral side structure to form a vehicle body structure, comprising:

bringing a roof panel together with a roof reinforcement frame to form the roof structure, folding a lateral side of the roof panel around an edge of the roof reinforcement frame to fasten the lateral side of the roof panel to the roof reinforcement frame by means of a hemming joint, fastening a side panel to an underlying side support structure to form the lateral side structure, bringing the roof structure together and in contact with the lateral side structure, and fastening the folded edge of the roof panel to the side panel by means of an elongated laser brazing joint.

By having the lateral side of the roof panel fastened to the roof reinforcement frame by means of a hemming joint a significant reinforcement of the strength and stability of the lateral side of the roof panel is accomplished in a cost-effective manner and without causing any substantial weight increase of the vehicle body structure. In particular, the hemming joint between the lateral side of the roof panel and the roof reinforcement frame allows an improved force transfer between the side panel and the roof structure, such that overall stiffness of the vehicle body structure in increased which is beneficial for driving performance, crash safety, and reduced noise and vibration. Moreover, the improved strength and stability of the lateral side of the roof panel accomplished by the hemming joint also results in better improved tolerances between the later side of the roof panel and side panel during assembly, such that an improved quality of the laser brazing joint is enabled.

Laser brazing of the joint connecting the roof panel and the side panel as such provides a strong high-quality joint that requires little refinishing work before painting and enables a smooth and desirable design, compared with other joining techniques such as glue or welding.

In one example embodiment, a thickness of a side edge of the roof structure is in the range of 1.5-4 mm, specifically in the range of 2-3 mm. This relatively small dimension enables a relatively small vertical distance between an outer side of the roof panel and an upper connection flange for joining an upper edge of the side panel with the underlying side support structure. Since the upper connection flange can be located closer to the roof panel more space is provided for the passenger compartment.

In one example embodiment, a thickness of a side edge of the roof structure is substantially equal to the sum of the thickness of a lateral edge of the roof reinforcement frame and twice the thickness of the roof panel. This typically results in a relatively small vertical distance between an outer side of the roof panel and the upper connection flange, and thus brings about the same advantage of increased passenger compartment space as described above.

In one example embodiment, the lateral side structure further comprises an upper connection flange for joining an upper edge of the side panel with the underlying side support structure, and a substantially vertical distance between an outer side of the roof panel and an inner side of the upper connection flange is less than 12 mm, specifically less than 10 mm, and more specifically less than 8 mm. This relatively small vertical distance enables increased passenger compartment space, as described above.

In one example embodiment, the roof reinforcement frame is fastened to the side support structure, and a substantially vertical distance between the roof panel and the side support structure at a location where the roof reinforcement frame is fastened to the side support structure is less than 15 mm, specifically less than 10 mm, and more specifically less than 8 mm. This relatively small vertical distance enables increased passenger compartment space, as described above.

In one example embodiment, the roof reinforcement frame is fastened to the side support structure by means of a mechanical fastener, such as a threaded fastener or a rivet. This means that no adhesive is necessary for securing the roof reinforcement frame to the side support structure, such that the manufacturing process is simplified. Moreover, adhesive generally result in a less accurate and reliable position control of the roof structure and the use of a mechanical fastener thus result in improved dimensional tolerances, such that the quality of the laser brazing joint is improved.

In one example embodiment, the roof reinforcement frame is fastened to the side support structure, and an attachment of the roof reinforcement frame to the side support structure is free from adhesive. This typically results in simplified manufacturing process improved quality of the laser brazing joint, as described above.

In one example embodiment, the roof reinforcement frame is fastened to the side support structure, and an attachment location of the roof reinforcement frame to the side support structure is laterally offset from an attachment location of the upper edge of the side panel with the underlying side support structure. Thereby the attachment location of the upper edge of the side panel with the underlying side support structure can be positioned closer the laser brazing joint and thus strengthen the side panel at the location of the laser brazing joint without causing problems related to lack of space for fastening of the roof reinforcement frame to the side support structure.

In one example embodiment, a lateral distance between the attachment location of the roof reinforcement frame to the side support structure and the attachment location of the upper edge of the side panel with the underlying side support structure is in the range of 10-200 mm, and specifically in the range of 20-100 mm. This arrangement typically strengthens the side panel, as described above.

In one example embodiment, a lateral distance between an edge of the laser brazing joint and the roof reinforcement frame is less than 15 mm, specifically less than 10 mm, and more specifically less than 5 mm. This relatively small lateral distance provides a very high stability of the roof panel at the location of the laser brazing joint, thereby further enhancing the strength and rigidity of the connection between the roof structure and lateral side structure. Moreover, the improved dimensional stability of the lateral edge of the roof panel caused by the closeness of the roof reinforcement frame results in improved tolerances and thus improved quality of the laser brazing joint. Finally, this may also enables use of a roof panel with reduced material thickness.

In one example embodiment, the lateral side structure further comprises an upper connection flange for joining an upper edge of the side panel with the underlying side support structure, and the side panel, starting from the upper connection flange, extends outwards to a first fold, and thereafter upwards past the laser brazing joint to a second fold, and thereafter further outwards, and a substantially vertical distance between an outer surface of the side panel at the second fold and an outer surface of the laser brazing joint, is in the range of 3-20 mm, specifically in the range of 5-15 mm. Thereby the connection of the side panel with the roof panel during for example a side impact associated with vehicle collision may be enhanced.

In one example embodiment, the lateral side structure further comprises an upper connection flange for joining an upper edge of the side panel with the underlying side support structure, and the side panel, starting from the upper connection flange, extends outwards to a first fold, and thereafter upwards past the laser brazing joint to a second fold, and thereafter further outwards, and the side panel defines an internal angle in the range of 91-150 degrees, specifically in the range of 100-135 degrees, at the second fold. By having the angle of the second fold above 90 degrees, and specifically above 100 degrees, the manufacturing process of the side panel is simplified, because the process of forming the side panel in a single pressing operation by means of a pressing tool is enabled when the side panel have an obtuse internal angle at the second fold, and an obtuse angle generally requires less deformation starting from a flat piece of sheet metal.

In one example embodiment, the lateral side structure further comprises an upper connection flange for joining an upper edge of the side panel with the underlying side support structure, and the side panel, starting from the upper connection flange, extends outwards to a first fold, and thereafter upwards past the laser brazing joint to a second fold, and thereafter further outwards, and the side panel is bent in an angle of less than 45 degrees, at the first fold. As described above, smaller fold angles generally results in simplified manufacturing process of the side panel due to manufacturing in a single pressing operation and due to overall less deformation starting from a flat piece of sheet metal.

In one example embodiment, the lateral side structure further comprises an upper connection flange for joining an upper edge of the side panel with the underlying side support structure, and a plane of the roof panel adjacent the laser brazing joint is substantially parallel with a plane of the underlying upper connection flange. Thereby the roof panel can be located close to the underlying upper connection flange.

The disclosure also relates to a vehicle comprising the vehicle body structure as described above.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION OF EXAMPLE EMBODIMENTS OF THE DISCLOSURE

Figure 1:
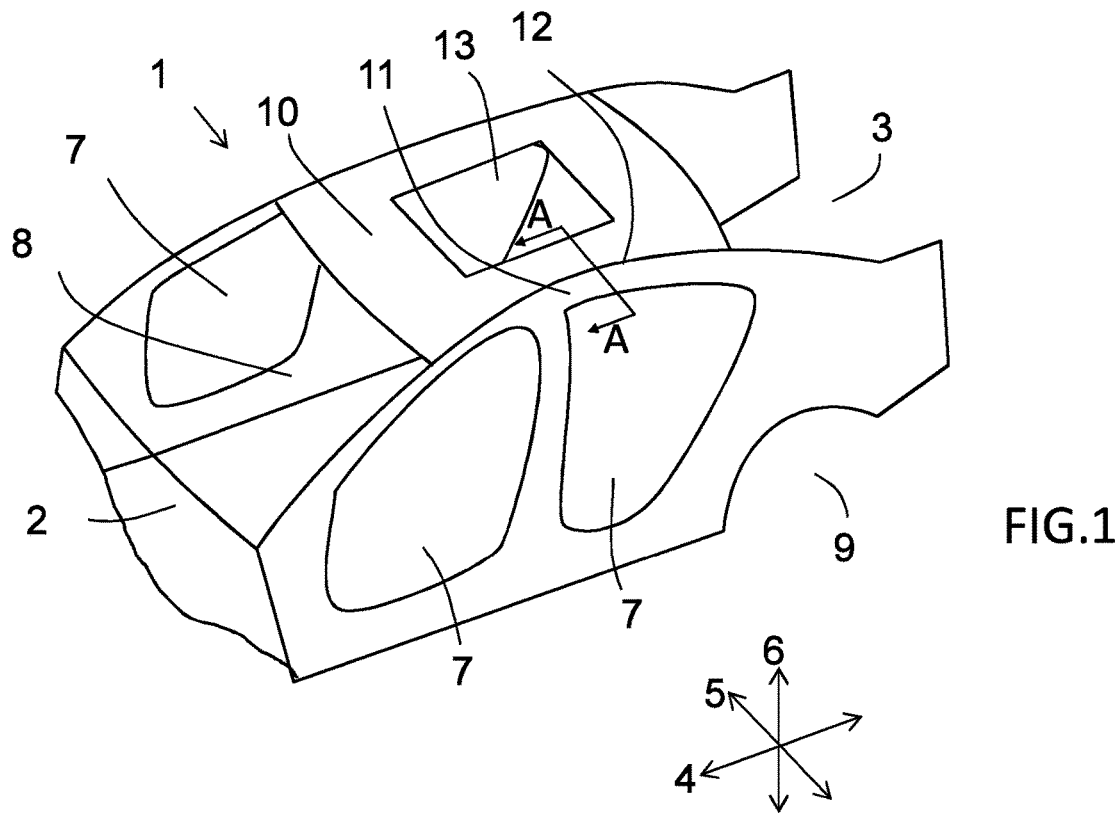
FIG. 1 shows a perspective view of an example embodiment of a vehicle body structure according to the disclosure.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Referring now to the FIG. 1 in particular, there is depicted an example vehicle body structure 1 according to the disclosure, wherein the example vehicle is a car. The vehicle body structure 1 comprises a front part 2, a rear part 3, a vehicle length direction 4, a vehicle lateral direction 5 and a vehicle vertical direction 6. The vehicle structure 1 is illustrated in a manufacturing state in which the sheet metal components of the structure have been joined together to a form a rigid structure of the finished vehicle. Details such as doors, hoods, the drive train, vehicle interior, etc. have not yet been assembled to the vehicle structure.

In FIG. 1, holes 7 for the front and rear door can be seen, as well as the hole 8 for the front wind screen and rear wheel compartment 9. A hole 13 for a sunroof is also illustrated. FIG. 1 further shows a roof panel 10, a side panel 11, and joint 12 there between.

In particular, the roof panel 10 and the side panel 11 are joined by means of laser brazing along an elongated laser brazing joint 12.

Figure 2:
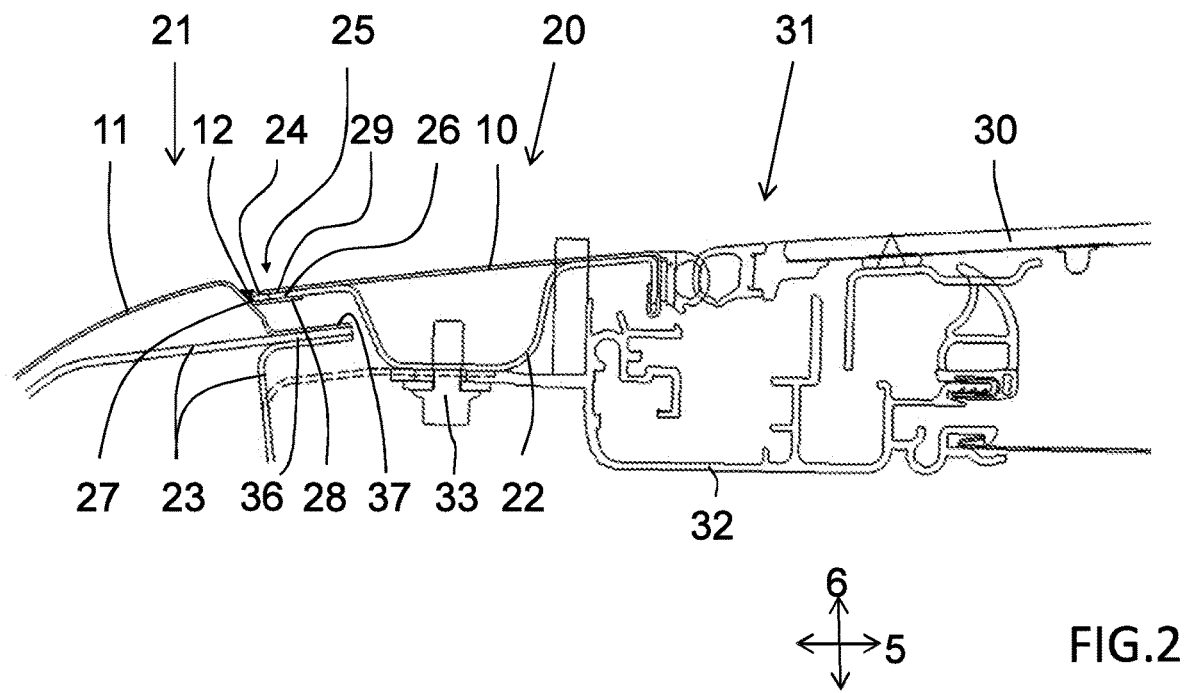
FIG. 2 shows a section along cut A-A in FIG. 1.

FIG. 2 schematically illustrates an example embodiment of a cross-section of the vehicle body structure along section A-A shown in FIG. 1. More in detail, the example vehicle body structure of FIG. 2 comprises a roof structure 20 and a lateral side structure 21 of the vehicle, as seen towards the front 2 of the vehicle in the vehicle length direction 4.

The roof structure 20 comprises 20 the roof panel 10 fastened to an underlying roof reinforcement frame 22. The lateral side structure 21 comprises the side panel 11 fastened to an underlying side support structure 23.

The roof reinforcement frame 22 is fastened to the side support structure 23 by means of a mechanical fastener 33, here in form of a threaded fastener. Consequently, no adhesive is necessary for securing the roof reinforcement frame 22 to the side support structure 23. Hence, the attachment of the roof reinforcement frame 22 to the side support structure 23 may be free from adhesive, thereby simplifying the manufacturing process and providing an improved quality of the laser brazing joint due to the better position control accomplished by the use of a mechanical fastener 33 instead of adhesive.

According to the example embodiment of FIG. 2, the side support structure 23 comprises an upper connection flange 36 for joining an upper edge 37 of the side panel 11 with the underlying side support structure 23. The upper edge 37 of the side panel 11 may for example be joined to the underlying side support structure 23 by a continuous or intermittent spot welding at a location 40 along the connection flange 36 in the vehicle length direction 4.

The roof panel 10 and side panel 11 are typically made of sheet metal, such as steel or aluminium, and with a thickness in the range of about 0.4-1.0 mm, specifically about 0.5-0.8 mm. The roof reinforcement frame 22 and side support structure 23 are typically also made of metal material but with a thicker and more rigid design.

A lateral side 24 of the roof panel 10 is fastened to the roof reinforcement frame 22 by means of a hemming joint 25 that is formed by folding a lateral side 24 of the roof panel 10 around an edge 26 of the roof reinforcement frame 22.

The hemming joint forms an integral mechanical attachment of the lateral side 24 of the roof panel 10 to the roof reinforcement frame 22. The folded side edge 27 of the lateral side 24 of the roof panel 10 form a substantially closed hem, wherein the folded end 28 has been plastically folded substantially 180 degrees to be substantially parallel with an unfolded part 29 of the roof panel of the hemming joint, such that the lateral side 24 of the roof panel 10 is clamped around the edge 26 of the roof reinforcement frame 22. In other words, the hemming joint 25 is formed by placing the roof panel 10 and the roof reinforcement frame 22 parallel and in contact with each other and subsequently rolling or folding a lateral end of the roof panel 10 over and around the edge 26 of the roof reinforcement frame 22, such that a substantially flush and permanent interlocking joint is formed. No further processing of the hemming joint 25 is typically necessary to form the permanent interlocking joint between the roof panel 10 and the roof reinforcement frame 22.

The side edge 27 of the roof panel 10 is subsequently fastened to the side panel 11 by means of the elongated laser brazing joint 12. A process for joining the roof panel 10 to the side panel 11 by laser brazing may for example comprise the steps of providing the panels 10, 11 in contacting relationship so as to form an elongated contact region, supplying a laser beam from a laser source to a laser focus head via a fibre optic cable, directing a focused mono or multi laser beam to the contact region, continuously supplying a consumable wire of filler material to a beam spot along feed direction, such that the heat of the laser beam melts the consumable wire and melted filler material penetrates into the gap in the joint between the panels 10, 11 and subsequently solidifies and creates a strong bond between said panels 10, 11.

FIG. 2 further shows a sunroof structure 31 mounted in the hole 13 of the example vehicle body structure 1. The sunroof structure 31 typically comprises a sunroof chassis 32 mounted to the side support structure 23 and a sunroof 30 movably mounted relative the sunroof chassis 32.

Figure 3:
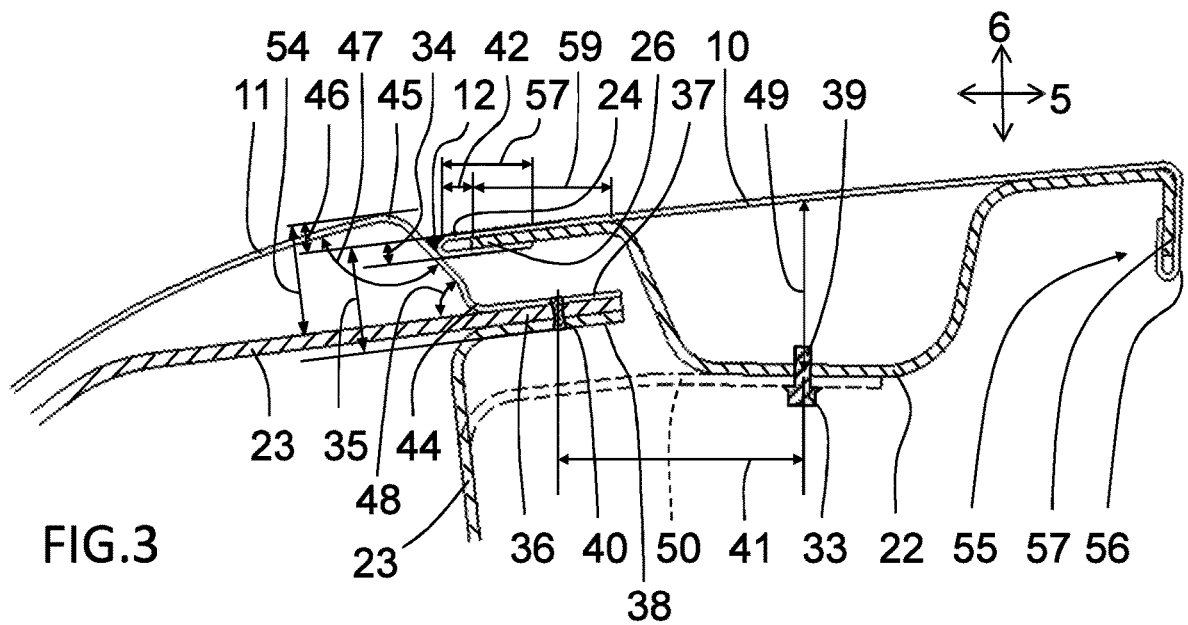
FIG. 3 shows a more detailed view of the section of FIG. 2.

Turning now to FIG. 3, which shows a more detailed view of the example embodiment cross-section of the vehicle body structure schematically illustrated in FIG. 2. A thickness 34 of the side edge 27 of the roof structure 20 is in the range of only 1.5-4 mm, and specifically in the range of 2-3 mm. In other words, the thickness 34 of the side edge 27 of the roof structure 20 is typically substantially equal to the sum of the thickness of the lateral edge 26 of the roof reinforcement frame 22 and twice the thickness of the roof panel 10.

The relatively small thickness 34 of the side edge 27 of the roof structure 20 according to the disclosure, which thickness is typically significantly smaller than the thickness of conventional non-hemming joint lateral sides 24 of the roof panel 10, enables a vehicle body design that has relatively small vertical distance 35 between an outer side of the roof panel 10 and an inner side 38 of the upper connection flange 36 without risk for interference between the lateral side 24 of the roof panel 10 and the upper connection flange 36, such that the upper connection flange 36 can be located closer to the roof panel 10 and thereby enabling more space for the passenger compartment.

For example, the substantially vertical distance 35 between the outer side of the roof panel 10 and the inner side 38 of the upper connection flange 36 is less than 12 mm, specifically less than 10 mm, and more specifically less than 8 mm.

The attachment location 39 of the roof reinforcement frame 22 to the side support structure 23 may be laterally offset from the attachment location 40 of the upper edge of the side panel with the underlying side support structure. Thereby the attachment location 40 of the upper edge 37 of the side panel 11 with the underlying side support structure 23 may be positioned closer the laser brazing joint 12 without interfering with the attachment of the roof reinforcement frame 22 to the side support structure 23. Furthermore, by locating the attachment location 40 of the side panel 11 with the underlying side support structure 23 closer the laser brazing joint 12 the side panel is strengthened at the location of the laser brazing joint, such that an overall stronger and more rigid connection arrangement of the roof structure 20 to the lateral side structure 21 is accomplished.

For example, a lateral distance 41 between the attachment location 39 of the roof reinforcement frame 22 to the side support structure 23 and the attachment location 40 of the upper edge 37 of the side panel 11 with the underlying side support structure 23 is in the range of 10-200 mm, and specifically in the range of 20-100 mm.

In fact, the roof reinforcement frame 22 may be attached to a laterally inwardly protruding bracket 50, which may be an integral part with the side support structure 23 as shown in FIG. 3, or which may be formed of a separate piece that has been secured to the of the side support structure 23. The bracket 50 may extend inwardly in a plane substantially parallel with and offset from the plane of the upper connection flange 36.

The opposite lateral side 56 of the roof panel 10, i.e. the side of the roof panel 10 facing the sunroof structure 31 in FIG. 2, is fastened to the roof reinforcement frame 22 by means of a second hemming joint 55 that is formed by folding the opposite lateral side 56 of the roof panel 10 around a second edge 57 of the roof reinforcement frame 22. The second hemming joint 55 is in all manners substantially identical with the first hemming joint 25, except for the plane of the second hemming joint 55, which plane is arranged substantially vertical.

As shown in FIG. 3, a lateral distance 42 between an edge of the laser brazing joint 12 and the edge 26 of the roof reinforcement frame 22 is less than 15 mm, specifically less than 10 mm, and more specifically less than 5 mm. This relatively small lateral distance 42 provides a very high stability of the roof panel 10 at the location of the laser brazing joint 12, simply because of the closeness of the edge 26 of the roof reinforcement frame 22 to the laser brazing joint 12 and the internal stability of the strong and rigid roof reinforcement frame 22. As a result, the connection between the roof structure and lateral side structure is strengthened and the dimensional stability of the lateral edge of the roof panel is improved. Moreover, the closeness of the edge 26 of the roof reinforcement frame 22 to the laser brazing joint 12 also results in improved tolerances and thus improved quality of the laser brazing joint.

The folded end 28 of the roof panel 10 may for example have a length 57 of about 3-30 mm, specifically about 5-20 mm, and more specifically of about 5-15 mm. This length 57 is deemed suitable for providing the necessary mechanical locking of the roof panel 10 to the roof reinforcement frame 22 by means of the hemming joint.

Furthermore, the roof reinforcement frame 22 may in the region adjacent the edge 26 of the roof reinforcement frame 22 extend in a plane that is substantially parallel with a plane of the roof panel 10, and the roof panel 10 may be arranged in contact with the roof reinforcement frame 22 in said region. For example, the roof panel 10 may be arranged in contact with the roof reinforcement frame 22 over a length 59 in said region in the range of 5-50 mm, and specifically 20-40 mm. Thereby, the roof panel 10 is provided with a relatively large surface support in the area adjacent the laser brazing joint 12.

The side panel 11 may be designed to have a form, starting from the upper edge 37 of the side panel 11 at the upper connection flange 36, that extends laterally outwards in a substantially horizontal direction to a first fold 44, and thereafter inclined upwards with an angle of about 20-50 degrees, past the laser brazing joint 12 to a second fold 45, and thereafter further laterally outwards and downwards with gradually increasing inclination from a horizontal direction.

A substantially vertical distance 46 between an outer surface of the side panel 11 at the second fold 45 and an outer surface of the laser brazing joint 12, may be in the range of 3-20 mm, specifically in the range of 5-15 mm. Thereby the connection of the side panel 11 with the roof panel 10 during for example a side impact associated with vehicle collision may be enhanced, and an esthetical attractive design is provided.

As shown in FIG. 3, the side panel 11 may have a form such that an internal angle 47 of the second fold 45 lies within the range of 91-150 degrees, specifically in the range of 100-135 degrees. By having the angle 47 of the second fold above 90 degrees, and specifically above 100 degrees, the manufacturing process of the side panel 11 is simplified due to the relatively small deformation of the side panel 11 in a direction perpendicular to the plane of the original, non-processed, sheet metal. In other words, the relatively open and obtuse internal angle enables manufacturing of the side panel 11 in a single pressing operation by means of a pressing tool, without any undercut in the finished side panel 11.

The side panel may define an angle 48 of less than 45 degrees at the first fold 44. As described above, smaller fold angles generally results in simplified manufacturing process of the side panel due to less deformation when starting from a flat piece of sheet metal.

As a result of the obtuse internal angle 47 at the second fold 45 and the relatively small angle 48 at the first fold 44, a substantially vertical distance 54 between the outer surface of the side panel 11 at the second fold 45 and the side support structure 23 at the upper connection flange 36 may be less than 30 mm, specifically less than 20 mm, and more specifically less than 15 mm. Thereby a relatively flat side panel is provided that may be stamped and pressed to the desired 3D-shape relatively cost-efficiently.

Moreover, a plane of the roof panel 10 in an area adjacent the laser brazing joint 12 is arranged substantially parallel with a plane of the underlying upper connection flange 36. This arrangement enables a close positioning of the roof panel relative the upper connection flange, such that increased passenger compartment space is made available, as discussed above.

A substantially vertical distance 49 between the roof panel 10 and the side support structure 23 at the location 39 where the roof reinforcement frame 22 is fastened to the side support structure 23 may in certain embodiments be small for enabling large passenger compartment space within the vehicle. In the example embodiment of FIG. 3 the substantially vertical distance 49 may for example be in the range of 20-40 mm.

Figure 4:
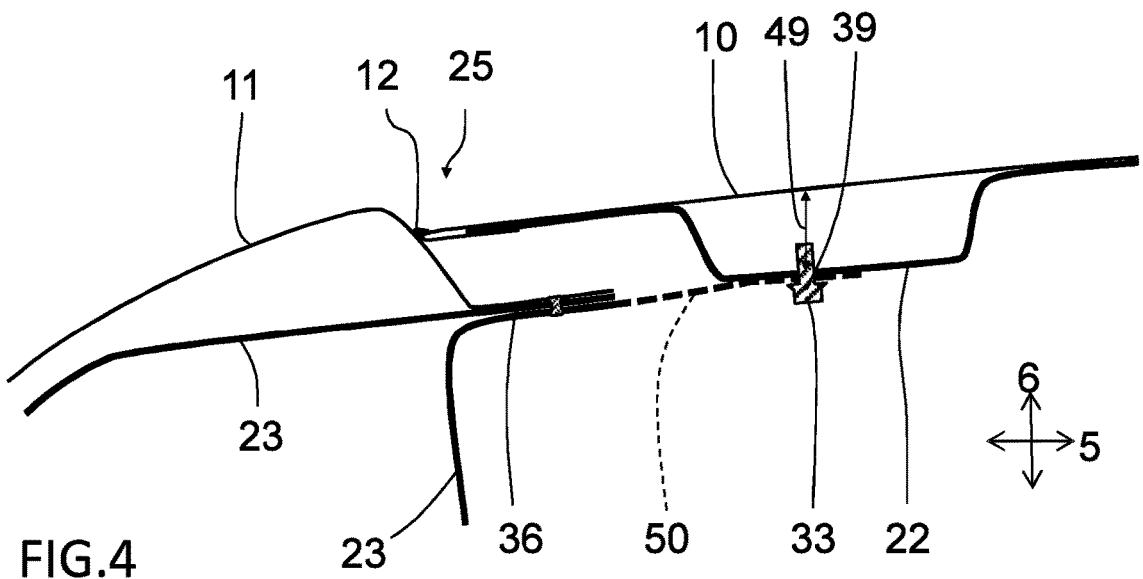
FIG. 4 shows an alternative embodiment of the vehicle body structure according to the disclosure.

FIG. 4 shows a slightly alternative embodiment of the vehicle body structure 1, wherein the bracket 50 is shown extending inwardly in a plane substantially parallel and coinciding with the plane of the upper connection flange 36. Thereby, the space of the passenger compartment may be even further enlarged.

For example, the substantially vertical distance 49 between the roof panel 10 and the side support structure 23 at the location 39 where the roof reinforcement frame 22 is fastened to the side support structure 23 may then be less than 15 mm, specifically less than 10 mm, and more specifically less than 8 mm.

The disclosure also relates to a method for connecting a vehicle roof structure 20 to a vehicle lateral side structure 21 to form a vehicle body structure 1. The method comprises the steps of:

bringing a roof panel 10 together with a roof reinforcement frame 22 to form the roof structure 20, folding a lateral side 24 of the roof panel 10 around an edge 26 of the roof reinforcement frame 22 to fasten the lateral side 24 of the roof panel 10 to the roof reinforcement frame 22 by means of a hemming joint 25, fastening a side panel 11 to an underlying side support structure 23 to form the lateral side structure 21, bringing the roof structure 20 together and in contact with the lateral side structure 21, and fastening a folded side edge 27 of the roof panel 10 to the side panel 11 by means of an elongated laser brazing joint 12.

The terms "substantially vertical" and "substantially horizontal" herein refers to orientations that may deviate a certain degree from the pure horizontal and vertical direction, for example due to the small inclination of the roof panel towards the lateral side in the area of the laser brazing joint connecting the roof panel with the side panel. Hence, the terms "substantially vertical" and "substantially horizontal" typically include orientations that deviate about +/−10 degrees from the pure horizontal and vertical direction.

Similarly, the term "substantially parallel" typically include orientations that deviate about +/−5 degrees from each other.

Although the disclosure has been described in relation to specific combinations of components, it should be readily appreciated that the components may be combined in other configurations as well which is clear for the skilled person when studying the present application. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

The invention claimed is:

1. A vehicle body structure comprising a roof structure and a lateral side structure, wherein the roof structure comprises a roof panel fastened to an underlying roof reinforcement frame, wherein the lateral side structure comprises a side panel fastened to an underlying side support structure, wherein a lateral side of the roof panel is fastened to the roof reinforcement frame by means of a hemming joint that is formed by folding a lateral side of the roof panel around an edge of the roof reinforcement frame, and wherein a folded side edge of the roof panel is fastened to the side panel by means of an elongated laser brazing joint, wherein the lateral side structure further comprises an upper connection flange for joining an upper edge of the side panel with the underlying side support structure, wherein the side panel, starting from the upper connection flange, extends outwards to a first fold, and thereafter upwards past the laser brazing joint to a second fold, and thereafter further outwards, and wherein the side panel defines an angle of more than 100 degrees at the second fold.

2. The vehicle body structure according to claim 1, wherein a thickness of the side edge of the roof structure is in the range of 1.5-4 mm.

3. The vehicle body structure according to claim 1 wherein a thickness of the side edge of the roof structure is substantially equal to the sum of the thickness of the lateral edge of the roof reinforcement frame and twice the thickness of the roof panel.

4. The vehicle body structure according to claim 1, wherein a substantially vertical distance between an outer side of the roof panel and an inner side of the upper connection flange is less than 12 mm.

5. The vehicle body structure according to claim 1, wherein the roof reinforcement frame is fastened to the side support structure, and wherein a substantially vertical distance between the roof panel and the side support structure at a location where the roof reinforcement frame is fastened to the side support structure is less than 15 mm.

6. The vehicle body structure according to claim 1, wherein the roof reinforcement frame is fastened to the side support structure by means of a mechanical fastener.

7. The vehicle body structure according to claim 1, wherein the roof reinforcement frame is fastened to the side support structure, and wherein an attachment of the roof reinforcement frame to the side support structure is free from adhesive.

8. The vehicle body structure according to claim 1, wherein the roof reinforcement frame is fastened to the side support structure, and wherein an attachment location of the roof reinforcement frame to the side support structure is laterally offset from an attachment location of the upper edge of the side panel with the underlying side support structure.

9. The vehicle body structure according to claim 8, wherein a lateral distance between the attachment location of the roof reinforcement frame to the side support structure and the attachment location of the upper edge of the side panel with the underlying side support structure is in the range of 10-200 mm.

10. The vehicle body structure according to claim 1, wherein a lateral distance between an edge of the laser brazing joint and the roof reinforcement frame is less than 15 mm.

11. The vehicle body structure according to claim 1, wherein a substantially vertical distance between an outer surface of the side panel at the second fold and an outer surface of the laser brazing joint, is in the range of 3-20 mm.

12. The vehicle body structure according to claim 1, wherein the side panel is bent in an angle of less than 45 degrees, at the first fold.

13. The vehicle body structure according to claim 1, wherein a plane of the roof panel adjacent the laser brazing joint is substantially parallel with a plane of the underlying upper connection flange.

14. Method for connecting a vehicle roof structure to a vehicle lateral side structure to form a vehicle body structure, comprising bringing a roof panel together with a roof reinforcement frame to form the roof structure, folding a lateral side of the roof panel around an edge of the roof reinforcement frame to fasten the lateral side of the roof panel to the roof reinforcement frame by means of a hemming joint, fastening a side panel to an underlying side support structure to form the lateral side structure, the lateral side structure having an upper connection flange joining an upper edge of the side panel with the underlying side support structure, bringing the roof structure together and in contact with the lateral side structure, and fastening the folded side edge of the roof panel to the side panel by means of an elongated laser brazing joint,.

wherein the side panel, starting from the upper connection flange, extends outwards to a first fold, and thereafter upwards past the laser brazing joint to a second fold, and thereafter further outwards, and wherein the side panel defines an angle of more than 100 degrees at the second fold.

15. The method according to claim 14, further comprising fastening the roof reinforcement frame to a laterally inwardly protruding bracket, which is an integral part of the side support structure, by means of a mechanical fastener.

16. A vehicle body structure comprising a roof structure and a lateral side structure, wherein the roof structure comprises a roof panel fastened to an underlying roof reinforcement frame, wherein the lateral side structure comprises a side panel fastened to an underlying side support structure, wherein the roof reinforcement frame is fastened to a laterally inwardly protruding bracket by a mechanical fastener, the laterally inwardly protruding bracket being an integral part of the side support structure, wherein a lateral side of the roof panel is fastened to the roof reinforcement frame by means of a hemming joint that is formed by folding a lateral side of the roof panel around an edge of the roof reinforcement frame, wherein a folded side edge of the roof panel is fastened to the side panel by means of an elongated laser brazing joint, wherein the lateral side structure further comprises an upper connection flange for joining an upper edge of the side panel with the underlying side support structure, wherein the side panel, starting from the upper connection flange, extends outwards to a first fold, and thereafter upwards past the laser brazing joint to a second fold, and thereafter further outwards, and wherein the side panel defines an angle of more than 100 degrees at the second fold.

* * * * *